United States Patent
Kawakami

[11] Patent Number: 5,882,811
[45] Date of Patent: Mar. 16, 1999

[54] METHOD FOR RECOVERING LITHIUM CELL MATERIALS

[75] Inventor: Soichiro Kawakami, Nara, Japan

[73] Assignee: Canon Kabushiki Kaisha, Tokyo, Japan

[21] Appl. No.: 949,530

[22] Filed: Oct. 14, 1997

Related U.S. Application Data

[60] Continuation of Ser. No. 548,548, Oct. 26, 1995, abandoned, which is a division of Ser. No. 200,468, Feb. 24, 1994, Pat. No. 5,491,037.

[30] Foreign Application Priority Data

Feb. 25, 1993 [JP] Japan .................... 5-036589

[51] Int. Cl.$^6$ .................................................. H01M 10/54
[52] U.S. Cl. ................................................. 429/49; 205/59
[58] Field of Search ............................... 429/49; 205/59, 205/407; 420/400

[56] References Cited

U.S. PATENT DOCUMENTS

| | | | |
|---|---|---|---|
| 4,158,720 | 6/1979 | Kaun ............................ | 205/59 X |
| 4,448,859 | 5/1984 | Bishop et al. ................. | 429/50 |
| 4,459,187 | 7/1984 | Laganá et al. ................ | 204/68 |
| 4,637,928 | 1/1987 | Zajac et al. .................. | 423/659 |
| 5,015,541 | 5/1991 | Evans ........................... | 429/49 |
| 5,491,037 | 2/1996 | Kawakami ..................... | 429/49 |

FOREIGN PATENT DOCUMENTS

WO94 07277 3/1994 WIPO .

OTHER PUBLICATIONS

Database WPI, Week 9309, 1993, Derwent Publications Ltd., AN 93–071401 & JP–A–5 017 832 (Daito Kagaku KK/Nomura Kosan KK), Jan. 26, 1993.

Extended Abstracts, vol. 81, No. 2, Oct. 1981, pp. 46–47, Marincic et al., "Disposal of Large Li/Soc12 Batteries", p. 46, L 1, p. 47, L 27.

Extended Abstracts, vol. 81, No. 2, Oct. 1981, pp. 48–49, McDonald et al., "Deactivation and Disposal of Large 10,000 Ah Li/SOC12 Batteries", p. 48, L 1, p. 49, L 26.

*Primary Examiner*—Stephen Kalafut
*Attorney, Agent, or Firm*—Fitzpatrick, Cella, Harper & Scinto

[57] ABSTRACT

To provide a method for treating nonaqueous solvent type cells, in particular, a method by which lithium cells can be treated and resources can be recovered in safe and in a good efficiency, a method for recovering resources of lithium cells comprises the steps of cutting or boring a lithium cell comprised of at least a negative electrode active material, a separator, a positive electrode active material, an electrolyte solution (electrolytic solution), a collector and a cell casing, in an ignition preventing means; washing the lithium cell thus opened, with an organic solvent to recover the electrolytic solution; reacting lithium with a reacting agent to recover lithium in the form of lithium hydroxide or a lithium salt; carrying out filtration to recover the separator, the collector and a positive electrode material comprising the positive electrode active material; and carrying out distillation to recover the organic solvent. This makes it possible to safely treat lithium cells having been used up, containing organic solvents and metallic lithium, and efficiently recover the resources. This also makes it easy to recycle lithium cells.

30 Claims, 7 Drawing Sheets

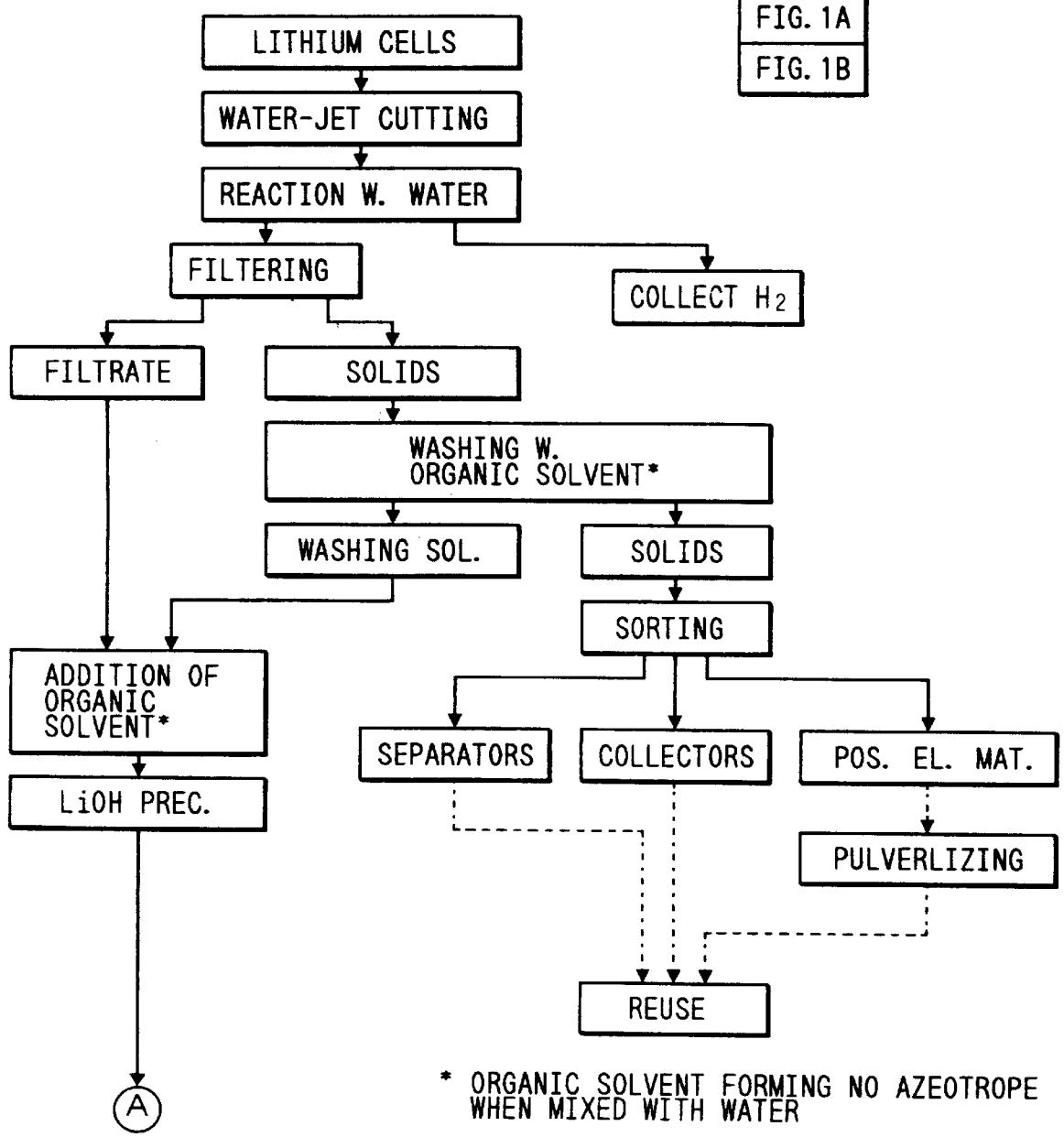

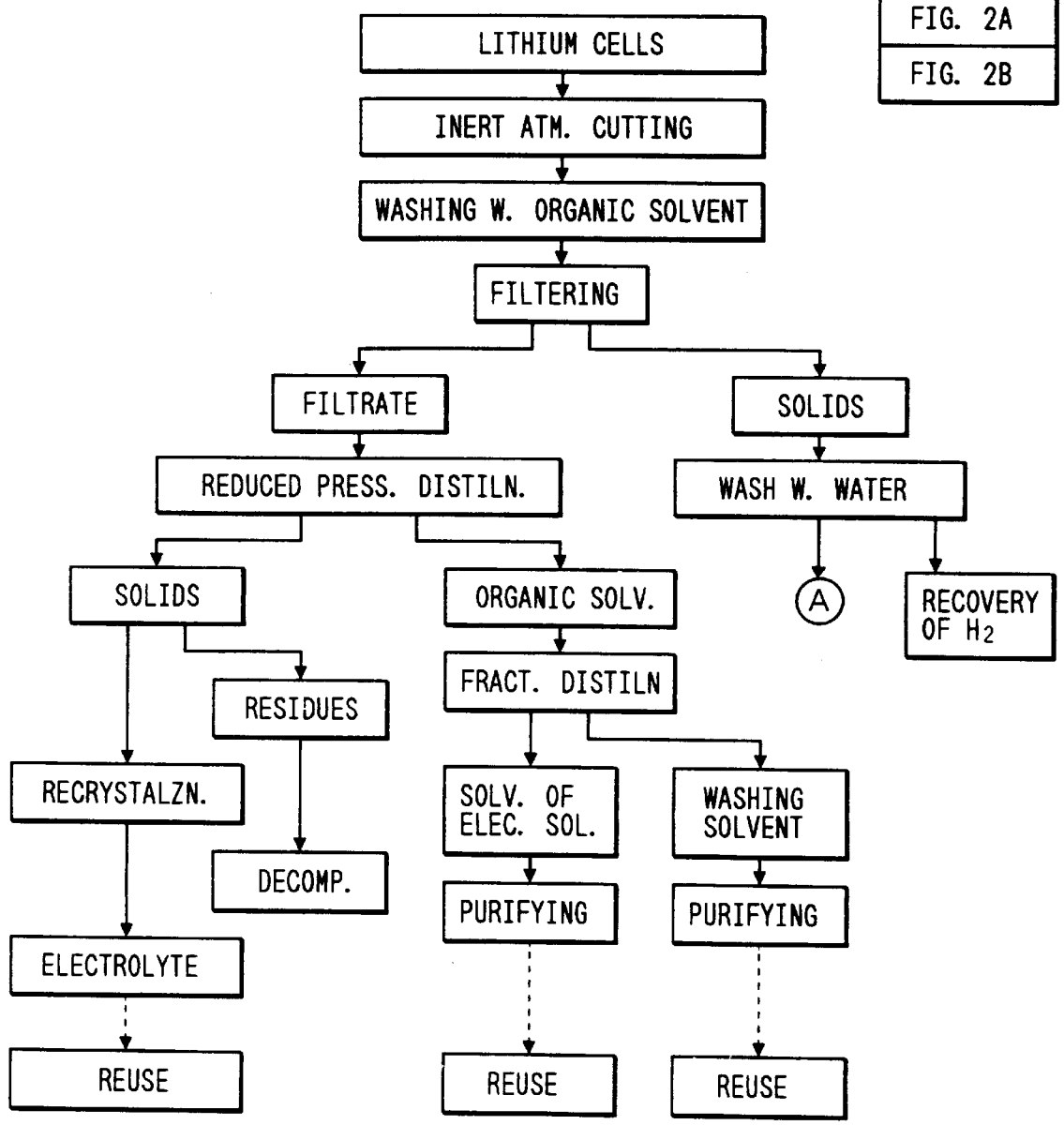

METHOD FOR RECOVERING LITHIUM CELL MATERIALS

This application is a continuation of application Ser. No. 08/548,548 filed Oct. 26, 1995, now abandoned, which is a divisional of application Ser. No. 08/200,468 filed Feb. 24, 1994 now U.S. Pat. No. 5,491,037.

BACKGROUND OF THE INVENTION

1. Field of the Invention

This invention relates to a method for treating nonaqueous solvent type cells, and more particularly to a method by which component materials constituting lithium-containing cells are safely and efficiently treated and recovered for their reuse.

2. Related Background Art

Recently, in anticipation of the earth's environment becoming warmer because of the greenhouse effect etc. due to an increase in $CO_2$, it becomes difficult to construct additional thermal power stations that discharge $CO_2$ in a large quantity and hence it is designed as a means for effectively utilizing electric generators, to carry out what is called load leveling, i.e., to accumulate nighttime power in secondary cells (storage cells) installed at general homes so that loads can be leveled and the power can be efficiently used. There is also an increase in demand for the development of secondary cells with a high energy density used for electric automobiles discharging no air pollution substances, and in demand for high-performance secondary cells used in power sources for portable machinery such as notebook personal computers or word processors, video cameras and portable telephones.

As the above high-performance secondary cells, rocking-chair type lithium ion cells making use of a positive electrode active material comprising lithium ions introduced as an interlayer compound and a negative electrode active material comprising carbon have gained a progress in development, and some of them are being put into practical use. Research and development are also accelerated in respect of lithium secondary cells making use of a negative electrode active material comprising metallic lithium, having a higher energy density than the lithium ion cells. In future, lithium cells are expected to be used over a wide range of from the above portable machinery power sources to electric automobiles, load conditioners and power storage.

Lithium cells making use of metallic lithium in the negative electrode, having been put into practical use as primary cells, have a very high energy density and hence have been used in large number in portable machinery such as cameras and wrist watches. They, however, are still in small number when compared with the total amount of the cells under consumption. Lithium cells formed into secondary cells can be repeatedly used and the quantity according to their use may decrease. However, with an expansion in their use as stated above, lithium-containing cells including lithium ion cells are expected to be used in an increasing amount (hereinafter, the lithium-containing cells are called lithium cells). With such an increase, the number of spent lithium cells may increase, of course.

From the standpoint of preservation of the earth's environment, resources including those in lithium cells must be recovered and reused to reduce industrial waste. [Herein, "recover" is meant to make at least part of component materials of a lithium cell into a reusable material(s)].

At present, metallic lithium that generates hydrogen upon its reaction with water and organic solvents are used in lithium cells, and there is a danger of ignition (or catching fire) when the resources constituting lithium cells are treated for their recovery. Because of use of a plurality of compounds, there is also the problem that they can not be recovered with ease. Thus, under existing circumstances, also because they are still used in a small amount, any perfect and simple method for recovering lithium cell materials and the reuse of recovered materials have not been found.

Accordingly, before lithium cells are developed, it is particularly sought to establish a method for recovering lithium cell materials in safe and in a good efficiency.

SUMMARY OF THE INVENTION

An object of the present invention is to provide a method for treating nonaqueous solvent type cells, in particular, a method for treating lithium cells and recovering lithium cell materials safely and with good efficiency.

To overcome the disadvantages hitherto involved as stated above, the present inventors made extensive studies. As a result, they have discovered that the resources constituting lithium cells can be recovered in safe and in a good efficiency without the ignition that may cause a fire, when lithium cell casings are opened by cutting or boring them by means of water jet or the like and thereafter lithium is reacted with a reacting agent such as water to make treatment to recover or collect lithium, by-product hydrogen and electrolyte for their reuse.

The present invention is a method for recovering lithium cell materials, including the steps of opening a lithium cell in an ignition preventing means, washing the lithium cell thus opened with an organic solvent to recover an electrolytic solution thereof, reacting lithium in said lithium cell with a reacting agent to recover lithium in the form of lithium hydroxide or a lithium salt, carrying out filtration to recover solid materials of said lithium cell, and carrying out distillation to recover the organic solvent; a method for recovering lithium cell resources, wherein the ignition preventing means including an opening apparatus using ultrahigh-pressure water; a method for recovering lithium cell materials, wherein the ignition preventing means is in water, in an alcohol, in an inert liquid or in an environment of inert gas; a method for recovering lithium cell materials, wherein the reacting agent to be reacted with the lithium is a reacting agent selected from the group consisting of water, an alcohol and an acid; a method for recovering lithium cell materials, wherein hydrogen is collected in the step of reacting the lithium; a method for recovering lithium cell materials, wherein the washing with an organic solvent is carried out using an organic solvent that forms no azeotrope when mixed with water; a method for recovering lithium cell materials, wherein the organic solvent that forms no azeotrope when mixed with water is methyl alcohol, acetone, 1,2-propanediol, dimethyl sulfoxide, butyrolactone, ethylene carbonate or propylene carbonate; a method for recovering lithium cell materials, wherein the method further comprises the step of filtration and recrystallization to recover an electrolyte; a method for recovering lithium cell materials, wherein the method further comprises the step of regenerating lithium by molten salt electrolysis from the lithium hydroxide or lithium salt recovered; a method for recovering lithium cell materials, wherein the method further comprises the step of burning at a high temperature, or decomposing by plasma, unreusable residues collected through the method; or a method for recovering lithium cell materials, wherein the lithium cell has a negative electrode active material comprising a material selected from the group consisting of metallic lithium, a lithium alloy and a carbon material.

The above method for recovering lithium cell materials makes it possible to recover lithium cell materials in safe and in a good efficiency.

DESCRIPTION OF THE PREFERRED EMBODIMENTS

Figure 1B:
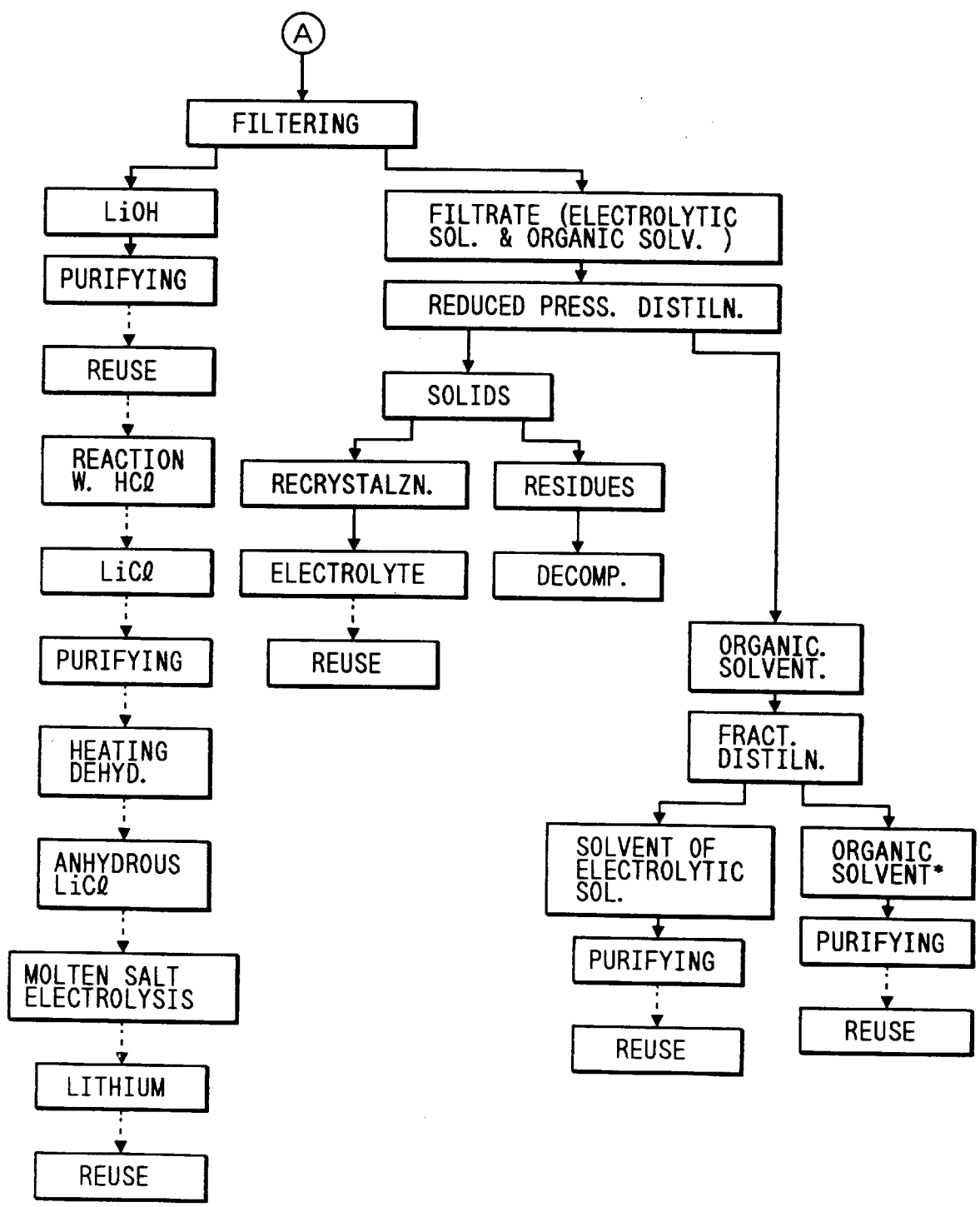
FIG. 1 is comprised of FIGS. 1A and 1B showing flow charts of a recovery method according to the present invention.

An example in which cell materials making use of a negative electrode active material comprising metallic lithium are treated and resources are recovered according to the present invention will be described below. First, spent lithium cells are opened by a means that may cause no ignition as in an inert environment. Thereafter, the contents of the cells are washed with an organic solvent to extract an electrolytic solution, followed by filtration to separate solid materials and liquid. Here, the organic solvent used in washing should be one of those having a relatively low boiling point. Use of such a solvent makes the solvent more readily recoverable afterwards. The resulting filtrate contains an electrolytic solution and the organic solvent used in washing, and the solid components contain lithium, collectors, positive electrode materials and separators. The solid components separated by filtration are immersed in water to cause lithium contained in the solid components to react with water, where hydrogen gas generated is collected and also filtration is carried out to separate the remaining mixture into an aqueous lithium hydroxide solution and solid materials. The resulting solid materials contain separators, collectors and positive electrode materials. The aqueous lithium hydroxide solution obtained or the lithium hydroxide obtained after evaporation is reacted with hydrogen chloride, further followed by drying and dehydration in hydrogen chloride to obtain lithium chloride, which is then subjected to molten salt hydrolysis to regenerate lithium. A mixture of the electrolytic solution in the filtrate with the washing liquid is distilled under reduced pressure to separate solvent and electrolyte. The solvent separated by distillation is subjected to fractional distillation to separate the solvent of the electrolytic solution and the organic solvent used in the washing. The electrolyte separated is purified by dissolving it in a solvent such as ethyl alcohol to carry out recrystallization. The solid components recovered are separated into metals of separators and collectors and positive electrode materials, which are thereafter respectively regenerated for their reuse. The positive electrode materials are comprised of positive electrode active materials, conductor powder, binders and so forth, which can be reused after pulverization.

Another example in which cell materials making use of a negative electrode active material comprising metallic lithium are treated and resources are recovered according to the present invention will be described below.

Spent lithium cells are opened in an ignition preventing means. Thereafter, first, the lithium in the cells is reacted with water to provide a mixed solution of an aqueous lithium hydroxide solution and an electrolytic solution, followed by filtration to separate them. At this time, hydrogen gas generated is collected. Next, solid components of the cells, separated by filtration are washed with an organic solvent such as methyl alcohol that forms no azeotrope when mixed with water, followed by addition to the filtrate of an organic solvent that forms no azeotrope when mixed with water, where lithium hydroxide is precipitated and filtered, and lithium is recovered in the form of lithium hydroxide.

The solution is comprised of a mixture of the electrolytic solution, the water and the organic solvent that forms no azeotrope when mixed with water is distilled under reduced pressure to recover electrolyte, further followed by fractional distillation of the solvent obtained, to recover the solvent of the electrolytic solution and the organic solvent that forms no azeotrope when mixed with water. The electrolyte recovered is recrystallized and purified for their reuse.

In both examples of the method for recovering lithium cells, when any residues that cannot be reused and collected are produced, the residues are decomposed at a high temperature or decomposed by plasma.

Opening means kept from ignition

Since a flammable organic solvent is used in the cells, the organic solvent must be prevented from catching fire to burn because of sparks or the like caused when the cells are opened by, e.g., cutting. Accordingly, it is necessary for the cells to be opened by a method in which oxygen is shut off so that no ignition takes place.

The opening means kept from ignition can be specifically exemplified by a method in which the cells are cut or bored by a water jet of ultrahigh-pressure water that may cause no generation of heat at cut surfaces, and a method in which the cells are mechanically cut or bored in an atmosphere of inert gas such as argon gas, in an inert liquid, in water or in an alcohol.

When outer cans of lithium cells are made of a relatively hard material such as a metal, an abrasive such as ceramic may be mixed in the ultrahigh-pressure water.

As the inert gas, it is possible to use helium, argon, xenon, neon and krypton, as well as nitrogen. In order to provide the atmosphere of inert gas, airtight space must be made up. As a simple method therefor, a method in which the cells are cut while blowing the inert gas against cutting portions may be used. As the inert liquid, perfluorocarbon or the like may be used. The perfluorocarbon is inflammable and also has a good thermal conductivity.

Of the opening means kept from ignition as described above, in particular, it is simple and preferable to use the cutting by a water jet, the cutting by an inert gas blown against cutting portions or the cutting in a liquid or vapor of perfluorocarbon.

Figure 6:
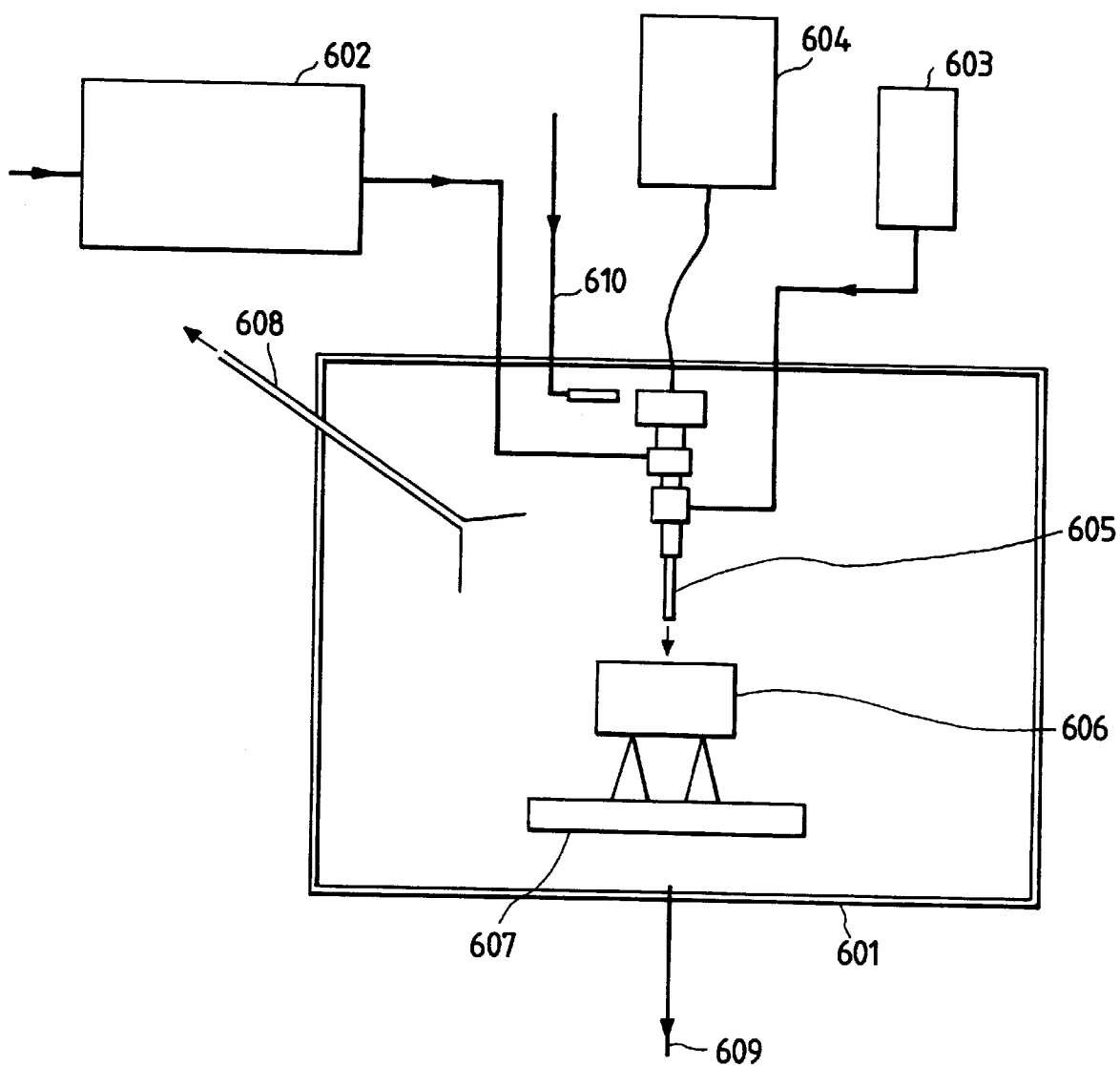
FIG. 6 is a diagrammatic view to show how a lithium secondary cell is opened in the means kept from ignition.

As an example in which the water jet is used, as shown in FIG. 6, an airtight container 601 is provided therein with an inert gas feed means 610, a water jet nozzle 605 connected with an ultrahigh-pressure pump 602, an abrasive tank 603 and a water jet controller 604, and a work table 607 to which a lithium cell 606 is secured, and an exhaust means 608 and a water discharge means 609 are each connected to the airtight container. Such an apparatus may be operated to carry out the cutting. The cutting by a water jet is ultrahigh-pressure water cutting that utilizes water under a pressure of 3,500 kg/cm$^2$ or more, where the ultrahigh-pressure water jetted from the nozzle 605 is sprayed to cut the cell. Depending on the material and thickness of an outer can of the cell, the cell can not be cut with ease in some instances if only the ultrahigh-pressure water is used. Thus, when it is made of a hard material and has a large thickness, a powder of an abrasive such as a ceramic including alumina and boron nitride or garnet is mixed into the ultrahigh-pressure water, where the abrasive and the water are sprayed under an ultrahigh pressure to carry out the cutting.

When the lithium cells are cut, hydrogen, having a flammable limit in a very broad range, is generated upon reaction of lithium with the water of the water jet. Hence, the exhaust means may preferably be provided in the vicinity of the cell cutting portion so that no explosion takes place on account of sparks caused at points for controlling the nozzle head of the water jet cutting apparatus or the work table to which the cell is secured. In addition thereto, it is more preferable to employ a method in which, e.g., the cell is cut in an inert gas atmosphere, electric contacts are placed in an inert gas atmosphere or the cell is cut while blowing an inert gas against the electrical contacts during the cutting.

Reaction of lithium with reacting agent

The lithium in the positive electrode active material, the lithium in the lithium negative electrode or the negative electrode active material, or the lithium deposited by electrolysis is reacted with a reacting agent for its recovery.

When water is used as the reacting agent, the water reacts with lithium to form an aqueous lithium hydroxide solution, followed by filtration and drying, so that lithium hydroxide can be obtained.

When an alcohol such as methyl alcohol is used as the reacting agent, it reacts with lithium to form an alcohol solution of lithium alkoxide, followed by filtration and then drying, so that lithium alkoxide can be obtained. Water may be added thereto, whereby an aqueous lithium hydroxide solution can be obtained.

When an acid such as hydrochloric acid is used as the reacting agent, it reacts with lithium to form a solution of a lithium salt such as lithium chloride, followed by filtration and then drying, so that a lithium salt can be obtained.

Organic solvent that forms no azeotrope when mixed with water

After water has been reacted with the lithium of lithium cells, in order to separate an electrolytic solution and lithium hydroxide, an organic solvent having a low solubility to lithium hydroxide is added to cause the lithium hydroxide to precipitate. In such an instance, if the organic solvent added forms an azeotrope when mixed with water, it is difficult to separate by fractional distillation the organic solvent from the water added in excess, and also it becomes necessary to remove the water using a dehydrating agent in a large quantity. However, in the case where the solvent that forms no azeotrope when mixed with water is used as the organic solvent to be added, it is unnecessary to use the dehydrating agent in a large quantity. Hence, the recovery steps can be lessened and the cost required can be decreased.

The organic solvent that forms no azeotrope when mixed with water may include, for example, methyl alcohol, acetone, 1,2-propanediol, dimethyl sulfoxide, butyrolactone, ethylene carbonate and propylene carbonate.

Recovery of electrolyte

The electrolyte is purified by repeating the step of dissolving it in a solvent such as ethyl alcohol followed by cooling and recrystallization. The electrolyte thus purified is further melted in a reduced pressure, followed by dehydration and drying, so that it can be reused.

Recovery of solid materials

The solid materials that are solid components other than the lithium of the lithium cells include cell casings, separators, collectors, positive electrodes comprising a positive electrode active material, and so forth. After they have been sorted out, some materials may be respectively melted or pulverized for their reuse.

Decomposition of residues

Unrecoverable polymers resulting from the solvent in the electrolytic solution are burnt at a high temperature or decomposed through plasma by microwave discharging in oxygen gas or hydrogen gas.

Constitution of Lithium Cell and Lithium Cell Materials

Figure 3:
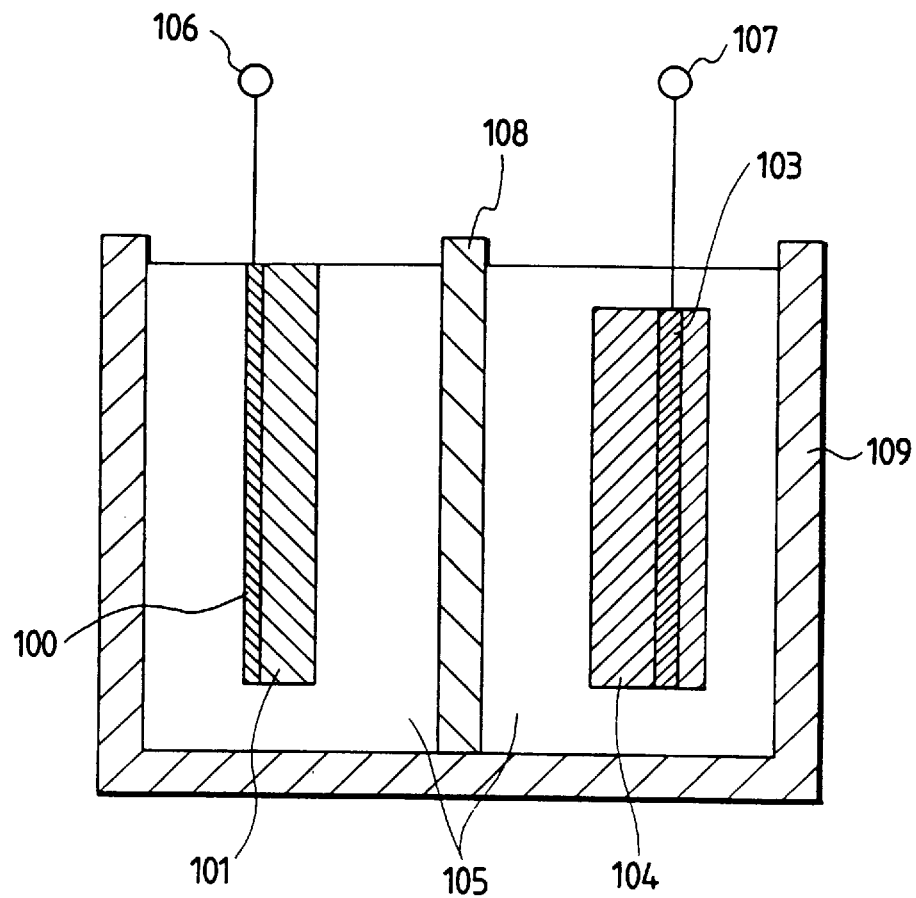
FIG. 3 illustrates a basic construction of a lithium cell.

Lithium cells are basically comprised of, as shown in FIG. 3, a negative electrode 101 comprised of a negative electrode active material, a positive electrode 104 comprised of a positive electrode active material, a negative electrode collector 100, a positive electrode collector 103, an electrolytic solution 105, a separator 108, output terminals 106 and 107 and a cell casing 109.

Actual cells have various forms including a flat-type, a cylinder type, a rectangular-type and a sheet type, which are used properly according to purposes and uses. In the case of spiral cylinder type cells, the negative electrode and the positive electrode with a separator held between them are wound whereby the negative electrode can be made to have a large area and large currents can be made flow at the time of charging and discharging. In the case of rectangular-type cells, the holding space in the machinery in which secondary cells are received can be effectively utilized. Viewed in the light of structure, there are single-layer structure and multilayer structure.

Figure 4:
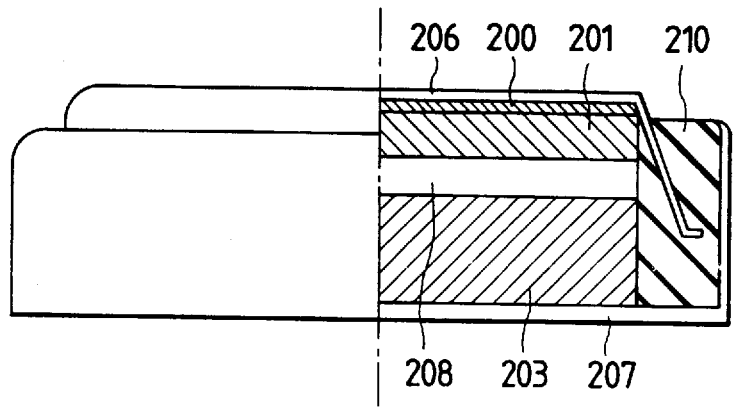
FIG. 4 is a schematic cross section of a flat-type lithium cell used in portable machinery.
Figure 5:
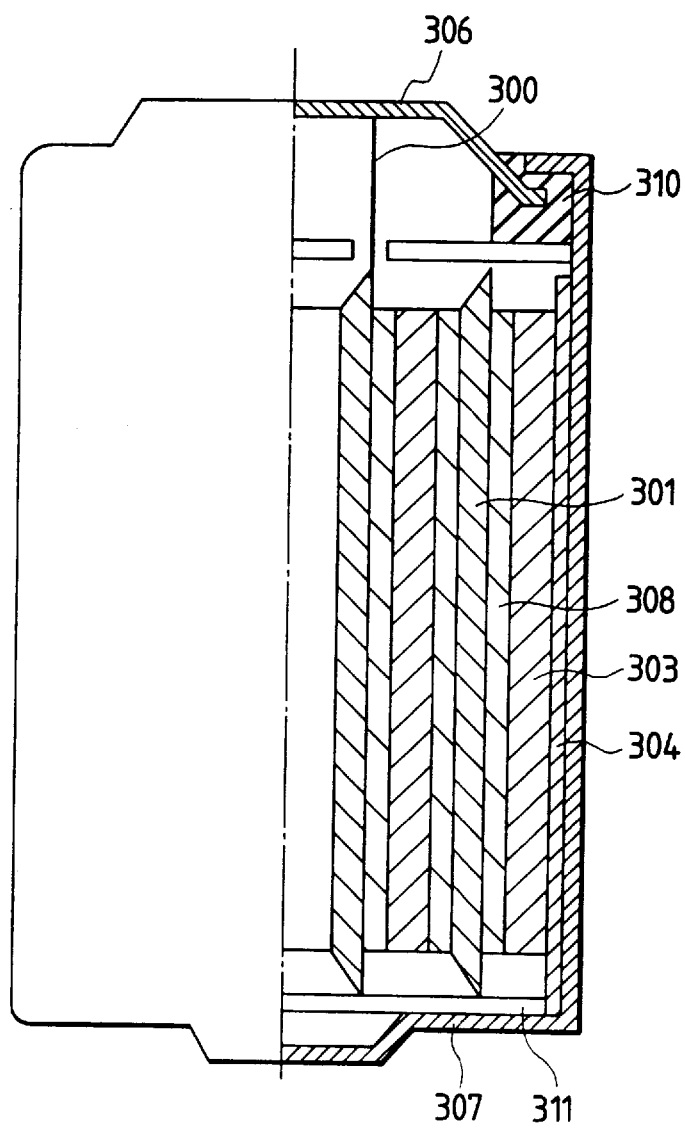
FIG. 5 is a schematic cross section of a cylinder type lithium cell used in portable machinery.

FIGS. 4 and 5 are schematic cross sections of a single-layer flat-type cell and a spiral structure cylinder type cell, respectively, used in portable machinery. In FIGS. 4 and 5, reference numerals 201 and 301 each denote a negative electrode comprised of a negative electrode active material; 200 and 300, a negative electrode collector; 203 and 303, a positive electrode comprised of a positive electrode active material; 304, a positive electrode collector; 206 and 306, a negative electrode terminal (a negative electrode cap); 207 and 307, an outer can (a positive electrode can) serving also as a cell casing; 208 and 308, a separator holding an electrolytic solution; 210 and 310, an insulating packing; and 311, an insulating plate.

The cell shown in FIG. 5 is constructed as follows: The negative electrode 301, the separator 308 and the positive electrode 303 are wound in a sandwich form, and thereafter set in the positive electrode can 307. After an electrolytic solution is injected, the negative electrode cap 306 and the insulating packing 310 are put together and caulked to make up a cell.

Lithium Cell Component Members

Collector

As materials for the collectors, conductive materials such as carbon, stainless steel, titanium, nickel, copper, platinum and gold are used.

As the form of the collectors, those having various forms such as a fibrous form, a porous form and a mesh form are used.

Positive electrode

The positive electrode is formed by mixing a positive electrode active material, a conductive powder and a binder, to which a solvent is optionally added, and molding the mixture together with the collector.

Positive electrode active material

The positive electrode active material that may be used includes metal oxides such as nickel oxide, cobalt oxide, titanium oxide, iron oxide, vanadium oxide, manganese oxide, molybdenum oxide and chromium oxide, metal sulfides such as molybdenum sulfide, iron sulfide and titanium sulfide, hydroxides such as iron oxyhydroxide, and conductive polymers such as polyacetylene, polyaniline, polypyrrole and polythiophene, between layers of which lithium is inserted.

Here, transition metal elements of transition metal oxides and transition metal sulfides are elements partly having filled d shells or f shells, and Si, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au are used. The first transition series metals Ti, V, Cr, Mn, Fe, Co, Ni, Cu are chiefly used.

Conductive powder

The conductive powder is used, as a role thereof, to assist electron conduction to make collection of electrons easy, when the active material has a poor conductivity.

The conductive powder that may be used includes various carbon materials such as acetylene black, Ketchen Black and graphite powder, and metallic materials such as nickel, titanium, copper and stainless steel. Mixing proportion of the conductive powder to the active material is 1 or less on the basis of weight.

Binder

The binder has the function of binding active material powder particles to prevent them from dropping away from the collectors because of cracks caused during a cycle of charging and discharging, when the active material has a poor molderability. Materials for the binder may include fluorine resins, polyethylene, polypropylene and silicone resins, which are stable to solvents. As the resins, those in the form of a liquid or a solution or having a low melting point should preferably be used so that the content of the binder in the electrode can be decreased and the capacity of a cell can be more improved. The resin used in the form of a liquid or dissolved in a solvent can be exemplified by, besides polyethylene and polypropylene, fluorine resins or silicone resins having an ether bond. In particular, in instances in which fluorine resins having an ether bond are used, they can be used in a low concentration when dissolved in a solvent and hence the content in the positive electrode can be decreased and the void can be increased.

Negative electrode active material

The negative electrode active material may include lithium and lithium alloys. The lithium alloys may include alloys of lithium and magnesium, aluminum, potassium, sodium, calcium, zinc, lead, etc.

Separator

The separator has the function of preventing the positive electrode and the negative electrode from shorting. In some instances, it also has the function of holding the electrolytic solution. The separator is required to have pores through which ions participating in cell reaction can move and to be insoluble in, and stable to, the electrolytic solution. Accordingly, non-woven fabric made of glass, polypropylene, polyethylene, fluorine resin or the like, or materials of a micropore structure are used. Metal oxide films having fine pores or resin films comprised of a composite with a metal oxide are also used. In some instances, metal oxide films having a multi-layer structure are used, which make it hard for dendrites, formed as a result of repetition of charging and discharging, to pass through and are effective for preventing short.

Electrolyte

The electrolyte is often used as it is. In other instances, a solution prepared by dissolving it in a solvent or those made stationary by adding a gelatinizer such as a polymer to the solution are used. In usual instances, the electrolyte is used in a state where an electrolyte solution (electrolytic solution) prepared by dissolving the electrolyte in a solvent is held on a porous separator.

The higher conductivity the electrolyte or the electrolytic solution has, the more preferable. Those having a conductivity of at least $1 \times 10^{-3}$ S/cm, and more preferably $5 \times 10^{-3}$ S/cm or higher, at 25° C. are used.

As the electrolyte, salts comprised of lithium ions ($Li^+$) and Lewis acid ions ($BF_4^-$, $PF_6^-$, $AsF_6^-$, $ClO_4^-$) and mixed salts of any of these are used. Besides the above supporting electrolytes, salts comprised of cations such as sodium ions, potassium ions or tetraalkylammonium ions and Lewis acid ions are also used. When used, the above salts are, e.g., heated under reduced pressure so that they are well dehydrated and deoxidized.

The solvent used to dissolve the electrolyte includes acetonitrile, benzonitrile, propylene carbonate, ethylene carbonate, dimethylformamide, tetrahydrofuran, nitrobenzene, dichloroethane, diethoxyethane, chlorobenzene, γ-butyrolactone, dioxolane, sulfolane, nitromethane, dimethyl sulfide, dimethyl sulfoxide, dimethoxyethane, methyl formate, 3-methyl-2-oxazolidinone, 2-methyltetrahydrofuran, sulfur dioxide, phosphoryl chloride, thionyl chloride, sulfuryl chloride, and mixtures of any of these.

The above solvent, when used, is dehydrated using activated alumina, molecular sieves, phosphorus pentoxide, calcium chloride or the like, or, depending on solvents, distilled in an inert gas in the presence of an alkali metal to carry out removal of impurities and dehydration.

In order to prevent the electrolytic solution from leaking, the solvent is in some instances previously set to gel. As gelatinizers, polymers capable of absorbing the solvent in the electrolytic solution to swell are used, as exemplified by polymers such as polyethylene oxide, polyvinyl alcohol and polyacrylamide.

Cell casing (Outer can)

As the cell casing, an outer can made of a metal serving also as an output terminal, as well as a resin material casing made of plastic, are used.

As materials for the positive electrode can 207 or 307 and the negative electrode cap 206 or 306 of actual cells, stainless steel, in particular, titanium-clad stainless steel or copper-clad stainless steel, and nickel-plated steel sheets, etc. are used.

In the cells shown in FIGS. 4 and 5, the positive electrode cans 207 and 307 serve also as cell casings. As materials for the cell casings, besides the stainless steel, metals such as aluminum, plastics such as polypropylene or composite materials of metals or glass fibers and plastics may be used.

Insulating packing

As materials for the insulating packing 210 and 310, fluorine resins, polyamide resins, polysulfone resins and all sorts of rubbers are used.

Seal

As sealing methods, besides the caulking, making use of gaskets such as insulating packing, methods such as adhesive bonding, welding, soldering and glass sealing are used.

Insulating plate

As materials for the insulating plate 311 used for the insulating separation in the cells, all sorts of organic resin materials and ceramics are used.

Safety valve

Not shown in FIGS. 4 and 5, in some instances, a safety valve utilizing a rubber, a spring, a metal ball is provided as a safety measure taken when the internal pressure of the cell becomes higher.

The present invention will be described below in greater detail by giving Examples. The present invention is by no means limited by these Examples.

EXAMPLE 1

Using spiral cylinder type lithium cells with the structure as shown in FIG. 5, treatment and recovery were successively carried out according to the flow chart shown in FIGS. 1A and 1B.

As the cell shown in FIG. 5, lithium cells having been used up were used in which metallic lithium foil was used as the negative electrode active material, a molded mixture of manganese dioxide, carbon and ethylene tetrafluoride resin as the negative electrode, nickel meshes as the collectors, polypropylene non-woven fabric and micropore polypropylene film as the separator, lithium tetrafluoroborate as the electrolyte, propylene carbonate as the solvent for the electrolyte, and titanium-clad stainless steel as the cap and the outer can.

The spent lithium cells were cut with a water knife (available from Flow Co.) making use of ultrahigh-pressure water. Thereafter, first, the lithium among the cell contents was reacted with water, the mixed solution of aqueous lithium hydroxide solution and electrolytic solution and the solid components were filtered, and the solid components were washed with methyl alcohol, which formed no azeotrope when mixed with water. Subsequently, methyl alcohol was added to the filtrate to cause the lithium hydroxide to precipitate for its separation, and lithium was recovered in the form of lithium hydroxide. The hydrogen gas generated as a result of the reaction of lithium with water was collected.

Next, the filtrate comprising methyl alcohol and the electrolytic solution was distilled under reduced pressure to recover an electrolyte lithium tetrafluoroborate, and the solvent obtained was also subjected to fractional distillation to recover propylene carbonate and methyl alcohol. Solid components of the cells were sorted into separators, nickel collectors and positive electrode materials and then recovered.

The lithium hydroxide recovered is purified and then reacted with hydrogen chloride to form lithium chloride, which is then dehydrated and dried, followed by molten salt electrolysis, whereby metallic lithium can be regenerated.

The electrolyte recovered is purified by dissolving it in ethyl alcohol to carry out recrystallization, and thus can be reused.

The cell casings (caps and outer cans), separators and nickel collectors recovered are melted or pulverized as the occasion requires respectively, and thus can be reused. The positive electrode materials recovered contain the positive electrode active material of manganese dioxide, the conductive powder carbon and the binder of fluorine resin, where they are pulverized, and can be reused.

The by-product hydrogen gas can be effectively used in various purposes.

The residues remaining in the recovery steps were decomposed through irradiation with oxygen plasma obtained by microwave discharging in oxygen gas.

EXAMPLE 2

Figure 2B:
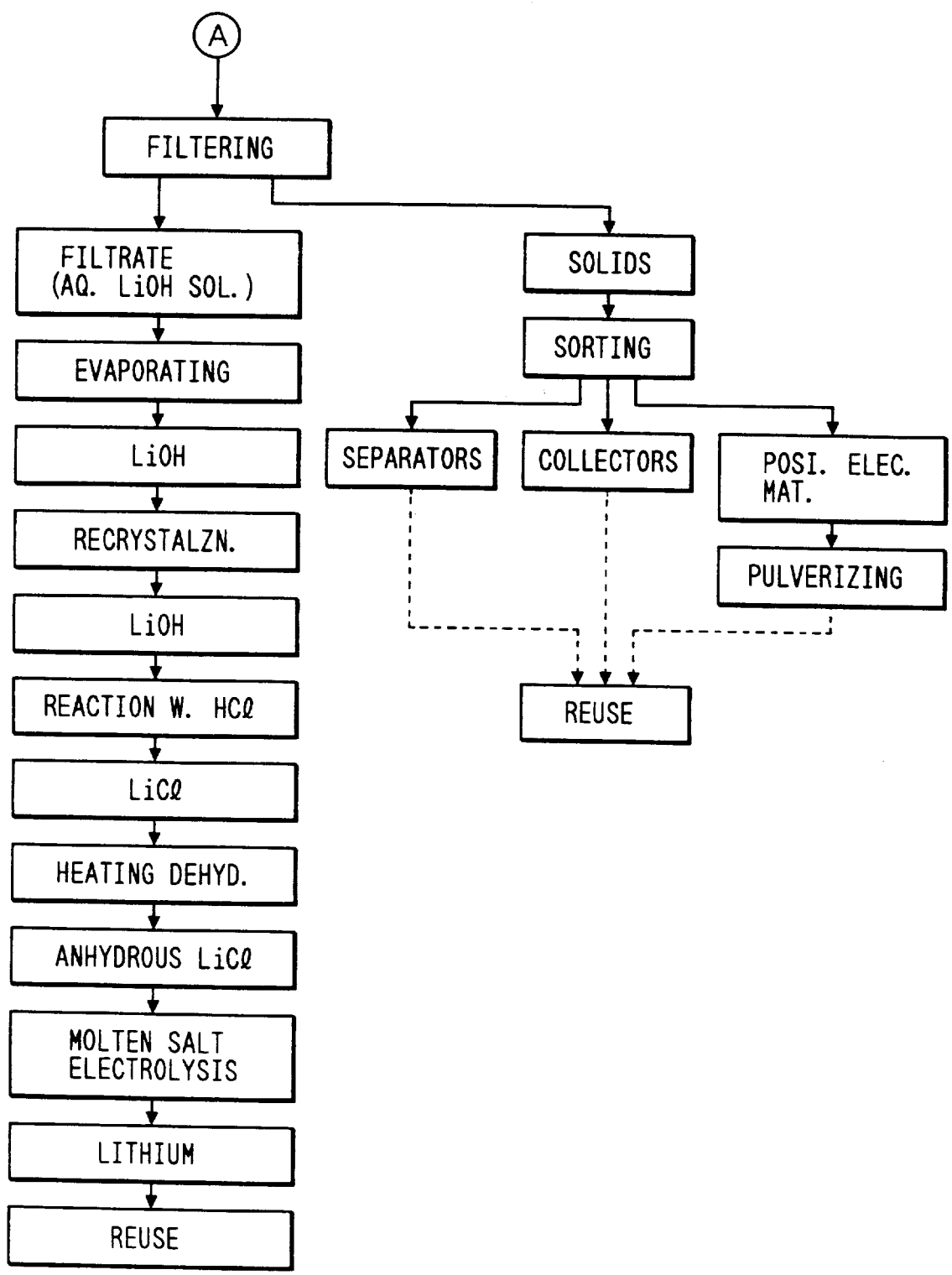
FIG. 2 is comprised of FIGS. 2A and 2B showing flow charts of another recovery method according to the present invention.

Using the same lithium cells as those in Example 1, treatment and recovery were carried out according to the flow chart shown in FIGS. 2A and 2B.

First, the spent lithium cells were cut under pressure of saturated vapor of a fluorine type inert liquid Florinate FC-72, trade name, available from 3M Co. Thereafter, cell contents were taken out and washed with acetone, followed by filtration to separate solid components and liquid. The filtrate contained electrolytic solution and acetone, and the solid components contained collectors, positive electrode materials and separators.

Next, the solid components separated by filtration were immersed in water to cause the lithium contained in the solid components to react with water, followed by filtration to separate aqueous lithium hydroxide solution and solid materials. The hydrogen gas generated as a result of the reaction of lithium with water was collected. The solid materials contained separators, collectors and positive electrode materials.

The aqueous lithium hydroxide solution thus obtained was evaporated to recover lithium hydroxide.

The resulting filtrate was distilled under reduced pressure to separate the solvent and the electrolyte lithium tetrafluoroborate. The solvent separated by distillation under reduced pressure was further subjected to fractional distillation to recover propylene carbonate and acetone.

The lithium hydroxide, lithium tetrafluoroborate, propylene carbonate, acetone, cell casings (caps and outer cans), polypropylene separators, nickel collectors and positive electrode materials thus recovered can be reused in the same manner as in Example 1.

The by-product hydrogen gas can be effectively used for various purposes.

The residues remaining in the recovery steps were decomposed through oxygen plasma in the same manner as in Example 1.

In Example 2, florinate vapor was used as an inert atmosphere. Treatment of the lithium cells and recovery of resources can be achieved by similar operation also when argon gas or nitrogen gas is used.

As described above, it has been ascertained from Examples 1 and 2 that lithium cells having been used up can be safely treated and materials used in the lithium cells can be recovered efficiently.

Needless to say, lithium cells can be again produced using the materials thus recovered.

According to the present invention, lithium cells having been used up, containing organic solvents and metallic lithium can be safely treated without causing ignition and also resources can be efficiently recovered. This makes it easy to recycle lithium cells.

What is claimed is:

1. A method for treating a lithium cell, comprising opening a lithium cell with (a) a water jet or (b) a mechanical opening means in an atmosphere of inert gas, in an inert liquid, in water or in an alcohol.

2. The method according to claim 1, wherein the lithium cell is opened by applying water ejected from a water jet.

3. The method according to claim 2, wherein the water contains an abrasive.

4. The method according to claim 3, wherein the abrasive comprises a ceramic or garnet.

5. The method according to claim 1, wherein the treatment by a water jet is effected in an atmosphere of inert gas.

6. The method according to claim 1, wherein the treatment by a water jet is effected while blowing an inert gas against a treated portion.

7. The method according to claim 1, wherein the treatment by a water jet is effected using a liquid under a pressure of 3,500 kg/cm$^2$ or more.

8. The method according to claim 1, wherein the treatment by a water jet is effected while exhausting hydrogen in the vicinity of a treated portion, said hydrogen generated by a reaction between the lithium and the water.

9. The method according to claim 1, wherein the inert gas comprises at least one gas selected from helium, argon, xenon, neon, krypton or nitrogen.

10. The method according to claim 5, wherein the inert gas comprises at least one gas selected from helium, argon, xenon, neon, krypton or nitrogen.

11. The method according to claim 6, wherein the inert gas comprises at least one gas selected from helium, argon, xenon, neon, krypton or nitrogen.

12. The method according to claim 1, wherein the inert liquid comprises perfluorocarbon.

13. A method for producing a lithium cell from a used lithium cell, comprising the steps of:
   (a) opening said used lithium cell with an opening means for preventing ignition and for excluding oxygen;
   (b) washing the opened lithium cell with an organic solvent to recover an electrolytic solution thereof;
   (c) reacting lithium in the lithium cell with a reacting agent to recover lithium in the form of lithium hydroxide or a lithium salt;
   (d) recovering solid materials of the lithium cell by filtration;
   (e) recovering the organic solvent by distillation; and
   (f) producing a new lithium cell by using at least one of the solid materials recovered in the above steps.

14. The method for producing a lithium cell according to claim 13, wherein the opening means for preventing ignition and for excluding oxygen comprises an opening apparatus using ultrahigh-pressure water.

15. The method for producing a lithium cell according to claim 13, wherein the opening means of preventing ignition and for excluding oxygen is a means for mechanically opening lithium secondary cells in water, in an alcohol, in an inert liquid or in an environment of an inert gas.

16. The method for producing a lithium cell according to claim 13, wherein the reacting agent is selected from the group consisting of water, an alcohol and an acid.

17. The method for producing a lithium cell according to claim 13, wherein hydrogen is formed and collected in step (c).

18. The method for producing a lithium cell according to claim 13, wherein the washing step (b) is conducted using an organic solvent that forms no azeotrope when mixed with water.

19. The method for producing a lithium cell according to claim 18, wherein the organic solvent that forms no azeotrope when mixed with water is methyl alcohol, acetone, 1,2-propanediol, dimethyl sulfoxide, butyrolactone, ethylene carbonate or propylene carbonate.

20. The method for producing a lithium cell according to claim 13, further comprising the steps of filtering and recrystallizing the electrolytic solution of step (b) to recover an electrolyte.

21. The method for producing a lithium cell according to claim 13, further comprising the step of regenerating lithium by molten salt electrolysis of the lithium hydroxide or lithium salt recovered.

22. The method for producing a lithium cell according to any one of claims 13, 20 or 21 further comprising the step of burning at a high temperature or decomposing by plasma, any unrecoverable residues formed and collected.

23. The method for producing a lithium cell according to claim 13, wherein the lithium cell contains a negative electrode active material comprising a material selected from the group consisting of metallic lithium, a lithium alloy and a carbon material.

24. A method for recovering lithium cell materials, comprising the steps of:
   opening a lithium cell in an opening means for preventing ignition and for excluding oxygen;
   reacting lithium in the opened lithium cell with water to provide a mixed solution of an aqueous lithium hydroxide solution and an electrolytic solution;
   filtering the mixed solution to provide solid components of the opened lithium cell and a filtrate;
   washing the solid components with an organic solvent; and
   adding an organic solvent to the filtrate to recover lithium in the form of lithium hydroxide.

25. The method for recovering lithium cell materials according to claim 24, wherein the opening means for preventing ignition and for excluding oxygen comprises an opening apparatus using ultrahigh-pressure water.

26. The method for recovering lithium cell materials according to claim 24, wherein the opening means of preventing ignition and for excluding oxygen is a means for mechanically opening lithium secondary cells in water, in an alcohol, in an inert liquid or in an environment of an inert gas.

27. The method for recovering lithium cell according to claim 24, wherein the lithium cell materials contains a negative electrode active material comprising a material selected from the group consisting of metallic lithium, a lithium alloy and a carbon material.

28. The method for recovering lithium cell materials according to claim 24, wherein washing the solid components with an organic solvent is conducted using an organic solvent that forms no azeotrope when mixed with water.

29. The method for recovering lithium cell materials according to claim 24, wherein an organic solvent that forms no azeotrope when mixed with water is used as an organic solvent added to the filtrate.

30. A method for producing a lithium cell from a used lithium cell comprising:
   (a) recovering at least one lithium cell material according to any one of claims 24–29; and
   (b) producing a new lithium cell employing the at least one lithium cell material recovered.

* * * * *

UNITED STATES PATENT AND TRADEMARK OFFICE
CERTIFICATE OF CORRECTION

PATENT NO. : 5,882,811
DATED : March 16, 1999
INVENTOR(S) : SOICHIRO KAWAKAMI

It is certified that error appears in the above-identified patent and that said Letters Patent is hereby corrected as shown below:

COLUMN 1

Line 19, "becomes" should read --has become--;
    Line 37, "gained a" should read --shown--;
    Line 45, "of" should be deleted; and
    Line 67, "are" should read --is--.

COLUMN 2

Line 8, "have" should read --has--;
    Line 12, "in safe and in a good efficiency." should read
--safely and efficiently.--;
    Line 23, "in safe and in a good" should be deleted; and
    Line 24, "efficiency" should read
--safely and efficiently--.

COLUMN 3

Line 5, "in safe and" should read
--safely and efficiently.--; and
    Line 6, "in a good efficiency." should be deleted.

COLUMN 4

Line 24, "their" should be deleted.

COLUMN 6

Line 41, "flow" should read --to flow--.

COLUMN 7

Line 54, "more" should be deleted.

UNITED STATES PATENT AND TRADEMARK OFFICE
CERTIFICATE OF CORRECTION

PATENT NO. : 5,882,811
DATED      : March 16, 1999
INVENTOR(S): SOICHIRO KAWAKAMI It is certified that error appears in the above-identified patent and that said Letters Patent is hereby corrected as shown below:

<u>COLUMN 12</u>

Line 47, "cell" should read --cell materials--; and
Line 48, "materials" should be deleted.

Signed and Sealed this

Fourteenth Day of December, 1999

Attest:

Attesting Officer

Q. TODD DICKINSON

Acting Commissioner of Patents and Trademarks